Feb. 24, 1953     E. F. VILTER     2,629,262
SIGHT GAUGE GLASS
Filed Jan. 13, 1949

INVENTOR
ERNEST F. VILTER
BY
ATTORNEYS

Patented Feb. 24, 1953

2,629,262

UNITED STATES PATENT OFFICE 2,629,262

SIGHT GAUGE GLASS

Ernest F. Vilter, Milwaukee, Wis.

Application January 13, 1949, Serial No. 70,738

2 Claims. (Cl. 73—326)

This invention appertains to sight glasses for water and like gages, and more particularly to a novel means for uniting such glasses with the metal fittings of gages whereby expansion and contraction of the parts possessing different coefficients of expansion is effectively taken care of.

One of the primary objects of this invention is to provide expansible metal bellows between the sight glass and the metal fittings of the gage, whereby to allow for expansion and contraction of parts without danger of breakage and with novel means for effectively uniting the metal bellows directly with the ends of the sight glass, so as to insure an air and water tight joint and to permit the bellows, in effect, to form a continuation or extension of the sight glass.

Another salient object of the invention is to provide means for permanently uniting copper or like expansion bellows with a tube of glass which consists in spraying or otherwise coating the ends of the glass with a thin skin of silver alloy or other selected metal and thereafter sweating the bellows directly on the glass.

A further object of the invention is to provide means for forming the bellows, so that shoulders or seats will be formed thereon for the glass tube and for engaging the metal fittings.

With these and other objects in view the invention consists in the novel construction, arrangement and formation of parts, as will be hereinafter more specifically described and claimed, and illustrated in the accompanying drawing, in which drawing:

Figure 1:
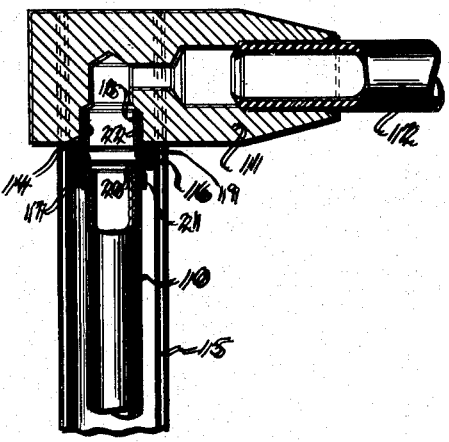
Figure 1 is a fragmentary vertical sectional view through a water or like gage illustrating the novel means employed for connecting the glass sight tube with the metal fittings.
Figure 2:
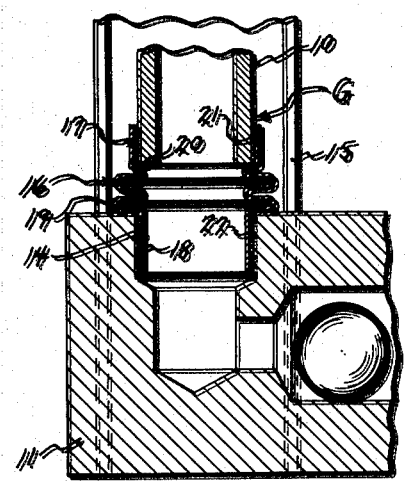
Figure 2 is an enlarged fragmentary detail vertical sectional view through the lower end of the gage illustrating in detail the novel means of connecting the sight glass with the gage.
Figure 3:
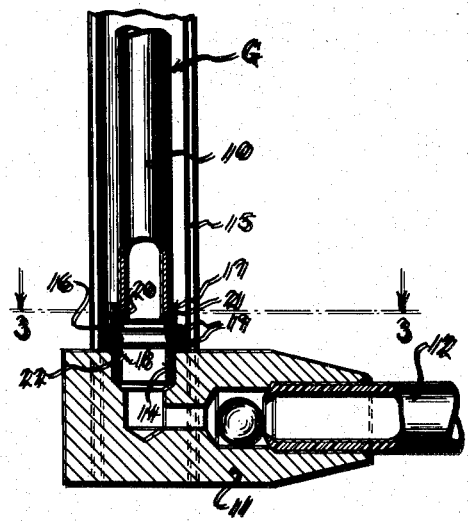
Figure 3 is an enlarged fragmentary detail horizontal sectional view taken on the line 3—3 of Figure 1, looking in the direction of the arrows.
Figure 3:
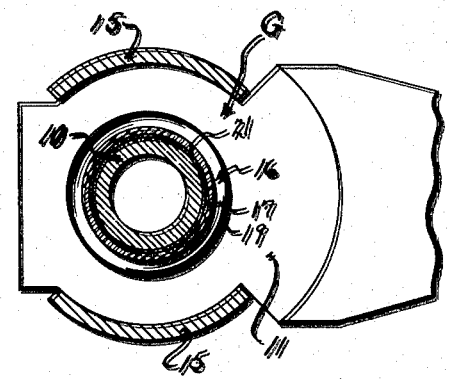
Figure 4:
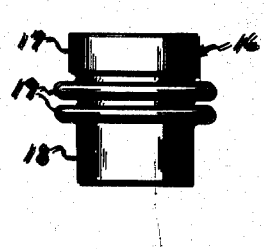
Figure 4 is an enlarged detail side elevational view of one of the bellows.
Figure 5:
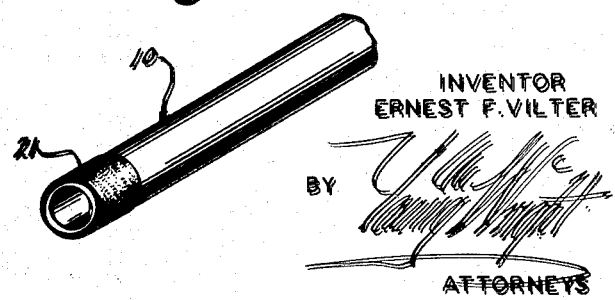
Figure 5 is a fragmentary detail perspective view showing one end of the glass sight tube prepared in accordance with this invention, the view being on substantially the same scale as Figure 1.

Referring to the drawing in detail, wherein similar reference characters designate corresponding parts throughout the several views, the letter G generally indicates a gage constructed in accordance with my invention and the same includes a glass sight tube, and end metal fittings 11, which can be connected in any desired way, such as by means of pipes 12 to a boiler, tank or to other desired piece of equipment, not shown. The metal fittings 11 can be and are of the same type and character employed in gages now in general use and hence these fittings are provided with vertical bores 14 in which, in ordinary usage, the ends of the sight glass are fitted. In accordance with this invention, the sight glass 10 is united with the fittings 11, in a new and novel manner. It is to be also noted that the gage G can also include guards 15 for protecting the sight glass 10 from breakage by external objects.

In the present instance, the sight glass or tube 10 is formed of a less length than the distance between the fittings 11, and expansion bellows 16 formed from copper or the like, are utilized for connecting the ends of the sight glass 10 with the fittings 11. The use of the expansion bellows 16 permits the desired give between the various parts of the gage.

Each bellows 16 includes end sleeves 17 and 18 and intermediate bellows folds 19. Particular attention is directed to the fact that the outermost bellows folds 19 are disposed adjacent to the outer sleeve 18 to form a shoulder, for a purpose, which will be later set forth. The innermost folds or convolutions 19 form an internal shoulder 20 adjacent to the innermost sleeve 17 for a purpose which will also appear.

One of the salient features of the invention is the novel means employed for uniting the bellows 16 directly with the terminals of the sight glass 10. In accordance with my invention, I directly spray or otherwise coat the outer surface of the sight tube 10, at its opposite ends, with a silver alloy or like metal 21, so that a thin skin of this solder forms a direct part of the tube or glass 10. The inner sleeves 17 of the bellows 16 are slipped over the soldered ends of the sight tube and these sleeves 17 are then directly united with the ends of the tube by sweating. The internal shoulder 20 of the bellows 16 forms a stop and a seat for the ends of the tube. This not only limits the insertion of the tube ends into the bellows but also insures against the flow of solder too far into the bellows. The sleeves 18 of the bellows 16 are now inserted into the bores 14 of the fittings 11 and are sweated to the walls of the bores as at 22. The outermost folds or convolutions 19 rest against the fittings and form a stop to limit the insertion of the sleeves 18 into the fittings.

Much stress is laid on the novel means employed for uniting the bellows to the sight glass, due to the fact that heretofore many difficulties have been experienced in uniting glass with metal and it has been discovered that by spraying metal directly on the ends of the glass, such metal forms a bond with the glass and thereafter permits the glass to be effectively sweated to the metal bellows.

Changes in details may be made without departing from the spirit or the scope of this invention, but what I claim as new is:

1. In a gage, end fittings having vertically aligned bores, a sight glass, the terminals of the sight glass being coated with metal, and metal bellows uniting the ends of the glass with the fittings, each bellows including an inner sleeve, an outer sleeve and connecting bellows folds, the coated terminals of said sight glass fitted in the inner sleeves, and said outer sleeves fitted in the bores of the fittings.

2. In a gage, end fittings having vertically aligned bores, a sight glass, the terminals of the sight glass being coated with metal, and metal bellows uniting the ends of the glass with the fittings, each bellows including an inner sleeve, an outer sleeve and connecting bellows folds, the coated terminals of the sight glass fitted in the inner sleeves, the innermost bellows folds defining internal stop shoulders for the sight glass terminals, and said outer sleeves being fitted in the bores of the fittings, the outermost bellows folds defining external stop shoulders for engaging the fittings.

ERNEST F. VILTER.

REFERENCES CITED

The following references are of record in the file of this patent:

UNITED STATES PATENTS

| Number | Name | Date |
|---|---|---|
| 49,366 | Belfield | Aug. 15, 1865 |
| 261,263 | Seymour | July 18, 1882 |
| 351,748 | Deane | Apr. 15, 1922 |
| 1,875,779 | Thomson | Sept. 6, 1932 |
| 1,884,665 | Greiner | Oct. 25, 1932 |
| 2,053,765 | Dana | Sept. 8, 1936 |
| 2,335,478 | Bergman | Nov. 3, 1943 |

FOREIGN PATENTS

| Number | Country | Date |
|---|---|---|
| 351,748 | Great Britain | Apr. 15, 1922 |
| 364,531 | Germany | Nov. 27, 1922 |
| 380,899 | Great Britain | Sept. 29, 1932 |